United States Patent
Dyckerhoff et al.

(10) Patent No.: US 9,022,454 B2
(45) Date of Patent: May 5, 2015

(54) TRIM PANEL OF MOTOR VEHICLES

(75) Inventors: Dirk Dyckerhoff, Seeshaupt (DE);
Franz Hipp, Koenigsdorf (DE); Heiko Herzog, Icking (DE); Horst Niefenecker, Munich (DE)

(73) Assignee: Toyota Boshoku Kabushiki Kaisha, Kariya-Shi (JP)

( * ) Notice: Subject to any disclaimer, the term of this patent is extended or adjusted under 35 U.S.C. 154(b) by 0 days.

(21) Appl. No.: 13/518,447

(22) PCT Filed: Nov. 12, 2010

(86) PCT No.: PCT/EP2010/067389
§ 371 (c)(1),
(2), (4) Date: Jun. 22, 2012

(87) PCT Pub. No.: WO2011/076483
PCT Pub. Date: Jun. 30, 2011

(65) Prior Publication Data
US 2012/0261934 A1    Oct. 18, 2012

(30) Foreign Application Priority Data
Dec. 23, 2009   (DE) .................. 10 2009 060 338

(51) Int. Cl.
*B60R 13/02*    (2006.01)
*B29C 63/04*    (2006.01)
*B29C 63/00*    (2006.01)
*B29C 63/02*    (2006.01)
*B29L 31/30*    (2006.01)

(52) U.S. Cl.
CPC ........... *B29C 63/04* (2013.01); *Y10T 156/1028* (2015.01); *B29C 2063/0008* (2013.01); *B29C 2063/022* (2013.01); *B29L 2031/3014* (2013.01); *B60R 13/0243* (2013.01); *B60R 2013/0281* (2013.01); *B60R 2013/0293* (2013.01)

(58) Field of Classification Search
CPC  B60R 13/02; B60R 13/0212; B60R 13/0237; B60R 13/0256; B60R 13/0243; B60R 2013/0281; B60R 2013/0293
USPC ............................ 296/146.7, 1.08, 1.09, 191
See application file for complete search history.

(56) References Cited

U.S. PATENT DOCUMENTS

| | | | |
|---|---|---|---|
| 5,336,352 A * | 8/1994 | Tokura ........................ | 156/214 |
| 5,573,617 A * | 11/1996 | Franck et al. ................ | 156/196 |
| 6,136,415 A * | 10/2000 | Spengler ...................... | 428/157 |
| 6,214,157 B1 * | 4/2001 | Spengler .................... | 156/304.6 |

(Continued)

FOREIGN PATENT DOCUMENTS

| | | |
|---|---|---|
| DE | 197 08 486 A1 | 9/1998 |
| DE | 299 16 377 U1 | 12/1999 |

(Continued)

OTHER PUBLICATIONS

English translation of WO2006/122919 printed Aug. 1, 2014.*

(Continued)

*Primary Examiner* — Gregory Blankenship
(74) *Attorney, Agent, or Firm* — Clements Bernard PLLC; Seth L. Hudson

(57) ABSTRACT

The invention relates to a method for producing trim panels of motor vehicles with lined visible surfaces made of real leather, imitation leather and/or fabric. The invention also relates to the thus obtained trim panels.

9 Claims, 2 Drawing Sheets

(56) References Cited

U.S. PATENT DOCUMENTS

Figure 1:
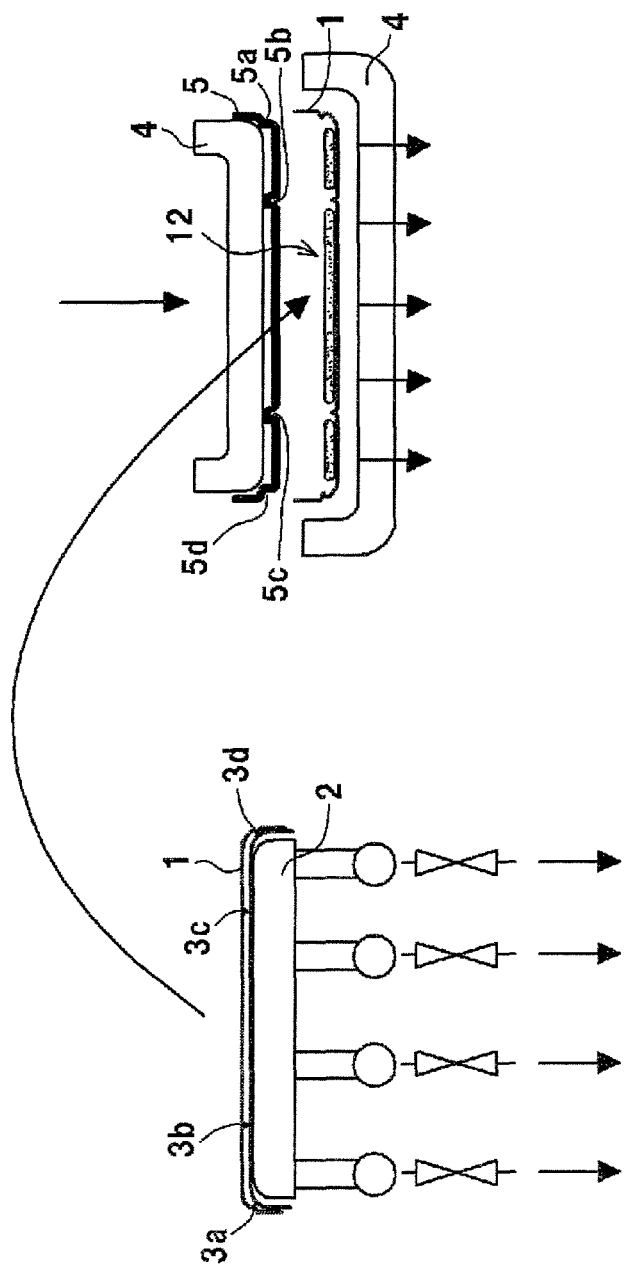

| | | | |
|---|---|---|---|
| 6,524,510 B2* | 2/2003 | Spengler | 264/248 |
| 7,052,566 B2* | 5/2006 | Wright et al. | 156/93 |
| 7,156,437 B2* | 1/2007 | Cowelchuk et al. | 296/1.08 |
| 7,425,029 B2* | 9/2008 | Dooley et al. | 296/1.08 |
| 7,744,983 B2* | 6/2010 | Ota et al. | 428/192 |
| 7,784,844 B2* | 8/2010 | Sato | 296/24.34 |
| 7,806,450 B2* | 10/2010 | Johnson et al. | 296/1.08 |
| 8,297,675 B2* | 10/2012 | Someschan et al. | 296/1.08 |
| 8,506,003 B2* | 8/2013 | Smith et al. | 296/146.7 |
| 8,530,028 B2* | 9/2013 | Smith et al. | 428/102 |
| 2007/0193673 A1* | 8/2007 | Aoyama et al. | 156/71 |
| 2008/0073807 A1 | 3/2008 | Cowelchuk et al. | |
| 2008/0157432 A1* | 7/2008 | Boyer | 264/257 |
| 2010/0171333 A1* | 7/2010 | Smith et al. | 296/1.08 |
| 2010/0279051 A1* | 11/2010 | Pokorzynski et al. | 428/43 |
| 2012/0261934 A1* | 10/2012 | Dyckerhoff et al. | 296/1.08 |
| 2013/0017365 A1* | 1/2013 | Gutt et al. | 428/141 |
| 2013/0147228 A1* | 6/2013 | Filipp | 296/70 |
| 2014/0004289 A1* | 1/2014 | Piccin et al. | 428/57 |
| 2014/0042767 A1* | 2/2014 | Filipp | 296/70 |

FOREIGN PATENT DOCUMENTS

| | | | | |
|---|---|---|---|---|
| DE | 101 38 130 A1 | | 2/2003 | |
| DE | 199 56 338 C2 | | 3/2003 | |
| DE | 10 2005 023 945 A1 | | 12/2006 | |
| DE | 10 2007 033 283 A1 | | 3/2008 | |
| EP | 0872383 A2 | | 10/1998 | |
| EP | 1 820 625 A1 | | 8/2007 | |
| EP | 2 065 153 A2 | | 6/2009 | |
| JP | 4-87832 | * | 3/1992 | B60R 13/02 |
| JP | 4 097832 A | | 3/1992 | |
| JP | 4097832 B2 | | 9/2000 | |
| JP | 2007-203955 | * | 8/2007 | B60R 13/02 |
| JP | 2007-223368 A | | 9/2007 | |
| JP | 2008-137437 | * | 6/2008 | B60R 13/02 |
| JP | 2009-196610 | * | 9/2009 | B60R 13/02 |
| JP | 2010-89696 | * | 4/2010 | B60R 13/02 |
| JP | 2012-81930 | * | 4/2012 | B60R 13/02 |
| JP | 2012-240308 | * | 12/2012 | B60R 13/02 |
| WO | 2006/122919 A1 | | 11/2006 | |

OTHER PUBLICATIONS

Original German language Office Action from European Patent Office for counterpart EP Application No. 10776362.5 and English translation.

May 27, 2014 Office Action issued in Japanese Patent Application No. 2012-545184 (with English-language translation.).

May 5, 2014 Chinese Office Action issued in Chinese Application No. 201080058532.0 (with English-language translation).

* cited by examiner

TRIM PANEL OF MOTOR VEHICLES

The invention relates to a method for producing trim panels of motor vehicles with linings on the visible surface made of real leather, artificial leather and/or textiles, and to the trim panels thus obtained.

A method for manufacturing trim panels in which leather or sensitive upholstery is applied to a support from EP 2 065 153 A2. In a first step, a soft foam or a non-woven are formed and subsequently foam-backed with a door trim support and thus bonded to one another. In a further step, the upholstery or lining surface is then prepared, and the above composite of soft foam and/or non-woven with the support is prepared.

Usually, such a pre-sewn cover is lined manually, with the corresponding disadvantages with respect to cost, quality and rejects. Alternatively, only partial components (armrest, window sill, map pocket) are lined separately and subsequently assembled to a door trim by various cost-intensive assembling and mounting steps.

In contrast, the object of the present invention is to provide trim panels of motor vehicles with linings on the visible surface made of real leather, artificial leather and/or textiles, in which material expansion and deforming of the visible surface is not possible. According to the invention, the object essentially is to automate (improve) the process for producing such trim panels of motor vehicles and thus to enable working at a lower cost while it is possible to exactly position functional and ornamental seams. In addition, it is to be possible to create a similarly high quality impression as with a usually multipart trim panel by using a multipart and multicolor pre-sewn cover. It is to be possible to use a one-part support and thus avoid additional cost for assembling methods and additional weight from the corresponding doubled materials.

Accordingly, in a first embodiment of the present invention, the above object is achieved by a process for producing trim panels of motor vehicles with linings on the visible surface made of real leather, artificial leather and/or textiles, wherein (a) in a first step, a pre-sewn cover (1) is prepared from different blanks made of real leather, artificial leather and/or textiles;
(b) in a second step, the pre-sewn cover (1) is mounted onto a positive mold (2) having the geometry of a trim support (5); characterized in that, in the second step, existing seams (3a, 3b, 3c, 3d) are adjusted and fixed on said positive mold (2) by applying reduced pressure on the backside of the pre-sewn cover (1);
(c) in a third step, said positive mold (2) with said pre-sewn cover (1) is transferred into a lining mold (3);
(d) in a fourth step, said positive mold (2) is removed after the reduced pressure on the positive mold (2) has been switched off, and said pre-sewn cover (1) is fixed within the lining mold (4) by reduced pressure on the visible side; and
(e) in a fifth step, a trim support (5) provided with an adhesive coating is lined with said pre-sewn cover (1).

The upholstery on the support 5 is applied thereto in the form of a so-called pre-sewn cover 1. This pre-sewn cover 1 comprises ornamental seams on the visible surface and functional seams in the geometrically complex regions (flanks, elevations etc.). Such seams are indispensable for enabling a lining on a complex-shaped support 5 with the grooves 5a, 5b, 5c and 5d, because material expansion and deforming as with usual plastic sheet linings is not possible, in particular, with leather or artificial leather.

According to the invention, the complete trim panel is lined with the pre-sewn cover 1 made of real or artificial leather or textiles, i.e., a complete leather, artificial leather and/or textile surface is produced and sewn together from different blanks with optionally different colors. The term "textiles" includes, among others, a material with the designation Alcantara®, i.e., a micro-fiber material based on polyester and polystyrene, which is often incorrectly referred to as leather or artificial leather.

Trim panels of motor vehicles within the meaning of the present invention include, in particular, door trims, roof pillars or trims in the region of the instrument panel. If the term "door trim" is used in the following in this description, it includes the above mentioned trim panels.

According to the invention, the pre-sewn cover 1 is automatically lined over lining molds 3 on the support 5, the design of the edges serving a particular function. While grooves 7 are usually formed into the support flanks for receiving the functional seams, beads 6 are of particular importance according to the invention in the region of the support edge instead of the grooves.

The grooves 7 of the prior art, especially in supports made of natural fibers, can be introduced only to a very limited extent, because separate tool slides are required for this. In addition, these grooves 7 of the prior art are unsuitable for automatic lining, because the seams must be pressed laterally into the grooves 7, which is not or only conditionally possible in an automated punch lining method.

According to the invention, beads 6 are introduced instead of grooves 7 in the region of the support edge, being readily prepared by pressing technology. In addition, the seam allowance can be pressed in from above, no lateral movement being necessary. However, tolerance compensation is to be considered the most important advantage of the bead 6 introduced according to the invention. Usually, pre-sewn covers are used and complete leather linings are performed only with small parts, such as armrests or handles. Large construction parts, such as a door trim, involve a number of problems, which are overcome according to the invention:

The support itself has tolerances (swell/shrink).
The blank production in the leather/artificial leather and/or textiles has tolerances.
The sewing process has tolerances.
Often, pre-sewn covers and supports are additionally shipped, wherein the dimensions can change because of different moisture uptakes or different temperatures.

In the prior art, this has the consequence that the pre-sewn cover and support do no longer ideally match, which results in problems of concealing and a high extent of rejects.

FIG. 1 shows the process according to the invention. The pre-sewn cover 1, which has been prepared from several blanks, optionally with different colors or surfaces made of real leather, artificial leather and/or textiles, is mounted onto a positive mold 2 having the geometry of a door trim support 5. It is fixed on this same positive form 2 by reduced pressure, and then the seams are adjusted.

Maintaining the reduced pressure, the positive mold 2 with the pre-sewn cover 1 is transferred into a lining mold 4. After the transfer, the reduced pressure on the positive mold 2 is switched off, and previously, simultaneously or subsequently, the pre-sewn cover 1 is fixed within the lining mold 4 by reduced pressure. Thus, the pre-sewn cover 1 can be transferred with exact positions.

Then, in another step, the support 5, which has already been coated with adhesive, is mounted onto a punch, optionally vacuum-fixed, and lined into a positioned pre-sewn cover 1 by punch pressure. Alternatively, it is of course also possible to apply the adhesive, not to the support 5, but to the back side of the pre-sewn cover 1. Alternatively, in addition, it is also possible to coat with adhesive both of the surfaces to be bonded together.

Figure 2:
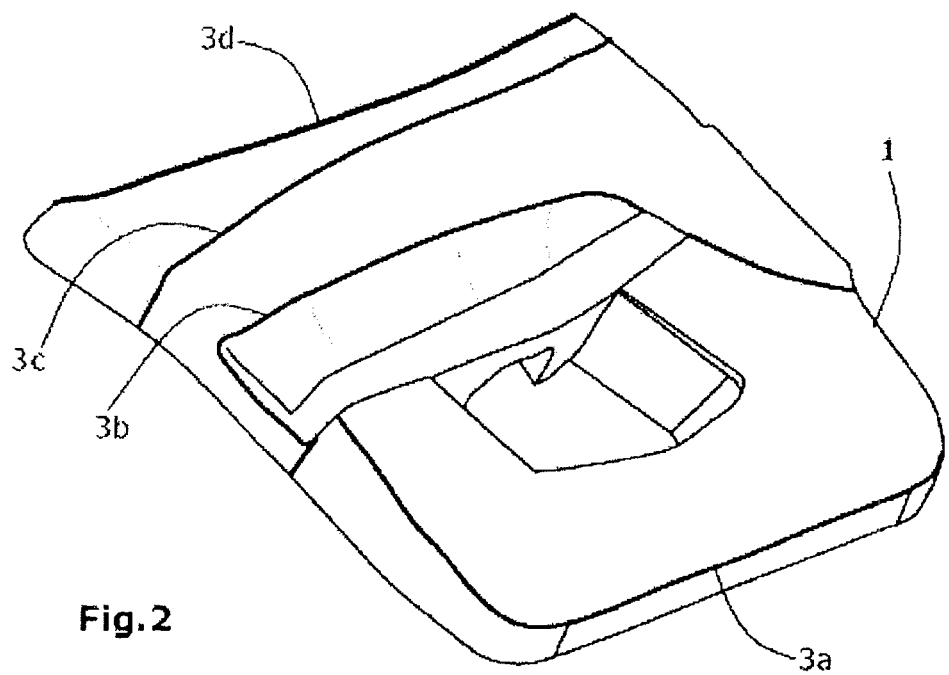

FIG. 2 shows a top view of a door trim 5, in which the functional seams 3a, 3b, 3c, 3d and ornamental seams are particularly highlighted.

Thus, according to the invention, a complete door lining support 5 is lined with a pre-sewn cover 1 made of real leather, artificial leather or textiles. Optionally, it is of course possible in an intermediate step to provide desired regions on the inner sides of the pre-sewn cover 1 with soft inserts 12 made of foam and/or non-woven. By this padding, the surface is softly padded with the foam or non-woven for optimum haptics. Thus, according to the invention, it is possible to dispense with a large-area or whole-area padding with foam or non-woven.

Figures 3, 4:
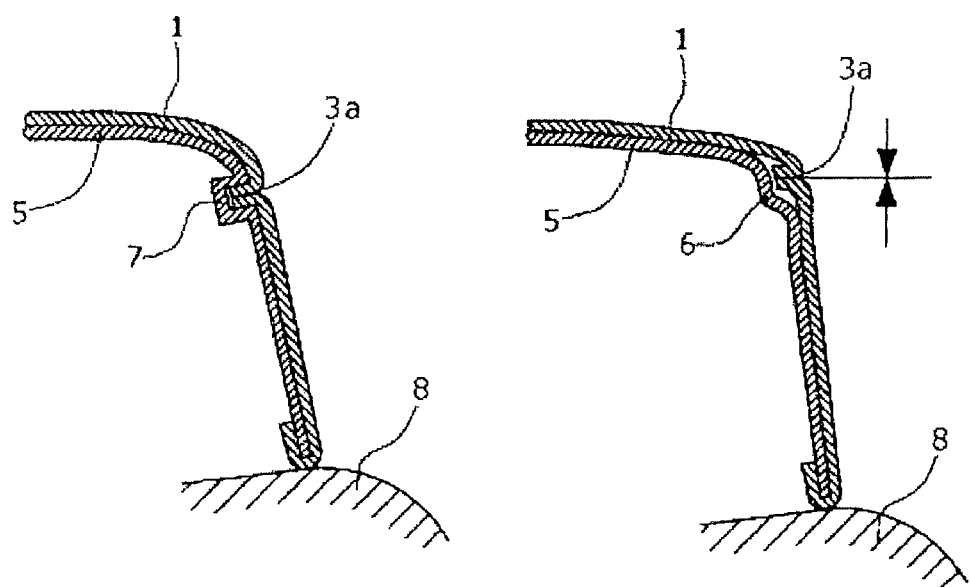

FIG. 3 shows a conventional edge design for a leathered door trim support 5. The functional seam 3a is accommodated in a groove 7, but must be exactly introduced here by the action of lateral sliders. This process is particularly complicated.

FIG. 4 shows an edge design according to the invention for automatic lining with a possibility of tolerance compensation. Here, the functional seam 3a or its seam allowance is accommodated within a bead 6 of the support 5 in the region of transition from the visible surface to the standing edge of the door trim 5 towards the door panel 8. The position of the seam allowance can be shifted upwards or downwards in order to achieve optimum matching here.

Even if it is not required according to the invention to provide the whole back surface of the pre-sewn cover 1 with a whole-area foam and/or non-woven, this is still possible without a problem, if the pre-sewn cover is provided with that very foam and/or non-woven, especially before fixing it on the positive mold 2 of the door trim support 5. Alternatively, it is of course also possible to provide the pre-sewn cover 1 already fixed within the lining mold 4 before being bonded with the support 5, or the support itself, with a corresponding complete foam or non-woven backing.

Thus, according to the invention, a pre-sewn cover 1 that is too large or too small can be shifted upwards or downwards in the region of the bead 6/functional seam 3a without resulting in bulges, creases or other optical impairments. In order to prevent that lining problems arise at the flanks, for example, when the pressure in the mold 4 is too low and thus the lining pressure is too low, resulting in a poor adhesive bonding, the lateral flanks are optionally pressed into position by means of moveable tool gliders in the mold 4, and thus an optimum tolerance-independent bonding is achieved. However, this use of laterally moveable tool gliders is usually not necessary according to the invention.

Because of the convex geometry in the region of the bead 6, the pre-sewn cover 1 spans the "hollow sites", and optimum surfaces without bulges or indentations can be produced.

In most cases, a door trim is offered in two or more variants, artificial leather on the one hand and real leather on the other. Since the pre-sewn covers are inserted in a lining mold and automatically lined, it is required that both the artificial and the real leather have almost identical material thicknesses, because otherwise the lining pressures would vary, and adhesion problems/creasing etc. would occur. If this cannot be done, a separate mold would have to be built for each variant, which would drive up investment costs.

An artificial leather usually has the following structure: cover layer of PVC or PUR, and behind it a knitwear, which is mostly laminated in during the production already (this knitwear keeps the holes from tearing during the sewing). In addition, a PP/PE or PUR foam can be directly laminated thereon for soft haptics. This material structure usually has a thickness of 1.5-2.5 mm, but can of course be varied in any way desired.

Real leather hides usually have a thickness of at least 0.8 to at most 1.3 mm. Thus, they are mostly significantly thinner than artificial leather structures and are thus problematic with respect to the filling of a mold cleft that is to match both surface variants.

Accordingly, a particular embodiment of the invention is to provide real leather hides with a foam backing and then to bond it with the support in the process according to the invention. This provision further has the advantage that the surface has better haptics, and in addition that unevenness, which may result from the natural fiber support of from the application of the adhesive, is somewhat leveled out. In addition, natural leather as such is not a homogeneous material having a defined wall thickness, but rather, its surface has some three-dimensional waviness, which may result in unsteady surfaces, especially in edge and crimping regions, when it is lined onto geometrically shaped supports. A backside foam lining will reduce this effect significantly.

A foam backing of real leather in this form is not commercially available, since real leather is usually either directly foam-backed with PUR in an automated process (which reduces the surface quality, however, because the leather is then firmly bonded with foams that are usually very rigid for reasons of process technology, which has the effect that the desired "displacing effect", i.e., shifting the leather when touched in a particular region, is no longer possible), or is manually lined on supports previously lined with non-wovens or so-called charmeuses. Often, leather is also bonded only at the seams, and the surfaces are only spanned in order to achieve maximum displacement effects. The lining of a PP/PE or PUR foam onto a natural leather according to the invention revealed some challenges in the course of the development. Thus, leather cannot be simply lined from a roll as is usual with plastic sheet materials, because only blanks, i.e., hides or die-cuts, are naturally available as a starting product.

According to the invention, the course of the process is as follows:

The leather hides are tested for leather flaws (mosquito bites, barbed wire marks etc.), designated according to leather quality zones, and subsequently blanks are prepared by a laser cutter or punching knives. These blanks are at first rough blanks and are again subjected to fine punching after the foam lining.

Subsequently, the blanks are lined with the previously prepared foam blank (previously provided with dispersion/hot-melt or solvent adhesive) in so-called flat bed presses by means of pressure and temperature. Subsequently, these blanks are subjected to fine punching and sewn into a complete pre-sewn cover. In part, the blank must be "sharpened" in the edge regions before sewing (i.e., the material structure in the region of the seam is tapering in order to avoid swelling up in the seam region).

However, particular challenges are met in the realization in detail:

Leather is a natural product, and depending on the zone on the animal, leather has very different strains and material hardness values. However, when leather is deformed over the geometry of a construction part, it is important that the backside of the leather can also move relatively. Because of the full-area foam lining according to the invention, this is possible only in a very limited way. As a consequence, leather shows particular surface flaws by creasing (also referred to as looseness of the leather) either after the foam lining or during the later lining of the pre-sewn cover, which are undesirable and lead to extremely cost-intensive rejects. However, if A-zone leather from the so-called core region is used, this effect is clearly less pronounced, because the leather hides have a higher quality here, which has an impact on the specific material properties; however, this increases the material costs many times over. A solution to this problem is to employ a foam type with a corresponding expandability, which allows some freedom of movement for the composite despite the full-area bonding, and avoids surface flaws in the finished component. Therefore, according to the invention, a polypropylene/polyethylene or polyurethane foam, especially with a Shore hardness L/C of 45 to 55, is preferably employed.

An alternative solution consists in the needling or slitting of the foam according to some pattern before the lining. The hollow sites then also cause some "movability".

Another embodiment of the present invention consists in trim panels of motor vehicles with linings on the visible surface made of real leather, artificial leather and/or textiles obtainable by the above described process, comprising a door trim support (5) and a visible surface of a pre-sewn cover (1) made of leather, artificial leather and/or textiles that also has at least one or several functional seams ($3a$, $3b$, $3c$) in addition to ornamental seams ($3d$), wherein said door trim (5) is characterized in that the backsides of the functional seams ($3a$, $3b$, $3c$) (seam allowances) are provided with perfect fit in at least one circumferential bead (6) in the region of transition from the visible surface to the standing edge towards the door panel (8).

Alternatively to the above mentioned process, it is also possible to produce the reduced pressure by tubular sheets or tubular cloths instead of the punch pressure method.

In addition, another embodiment is the provision of trim panels of motor vehicles with linings on the visible surface made of real leather, comprising a trim support (5) and a foam-lined visible surface of a pre-sewn cover (1) made of real leather. More preferably, a foam blank made of polypropylene/polyethylene or polyurethane provided with a commercially available adhesive is employed.

The invention claimed is:

1. A process for producing trim panels of motor vehicles with linings on a visible surface made of real leather, artificial leather and/or textiles, wherein
   (a) in a first step, a pre-sewn cover (1) is prepared from different blanks made of real leather, artificial leather and/or textiles;
   (b) in a second step, the pre-sewn cover (1) is mounted onto a positive mold (2) having the geometry of a trim support (5);
   characterized in that, in the second step, existing seams ($3a$, $3b$, $3c$, $3d$) are adjusted and fixed on said positive mold (2) by applying reduced pressure on a backside of the pre-sewn cover (1);
   (c) in a third step, said positive mold (2) with said pre-sewn cover (1) is transferred into a lining mold (3);
   (d) in a fourth step, said positive mold (2) is removed after the reduced pressure on the positive mold (2) has been switched off, and said pre-sewn cover (1) is fixed within the lining mold (4) by reduced pressure on the visible side; and
   (e) in a fifth step, a trim support (5) provided with an adhesive coating is lined with said pre-sewn cover (1) with at least one bead (6) congruent thereto that is congruent to the seams ($3a$, $3b$, $3c$, $3d$) is employed in the region of transition from a visible surface to a standing edge of the trim support towards a door panel (8), wherein the at least one bead is formed into substantially an L-shape in vertical cross section, one end of the bead is engaged to a side of the visible surface of the trim support, and the other end is connected to a side of the standing edge of the trim support.

2. The process according to claim 1, characterized in that soft inserts made of foam and/or non-woven are provided in desired regions on the inner sides of the pre-sewn cover (1) in an intermediate step before the first step and before the second step.

3. The process according to claim 1, characterized in that the blanks are prepared with different colors.

4. The process according to claim 1 with a visible surface made of real leather, characterized in that a leather blank is lined with a foam blank containing polypropylene/polyethylene or polyurethane.

5. The process according to claim 1, characterized in that a pre-sewn cover (1) having functional and/or ornamental seams ($3a$, $3b$, $3c$, $3d$) is employed.

6. The process according to claim 1, characterized in that the lining is effected by means of punch pressure.

7. The process according to claim 1, characterized in that a pre-sewn cover (1) is employed whose lining backside is provided with a full-area foam and/or non-woven.

8. Trim panels of motor vehicles with linings on the visible surface made of real leather, artificial leather and/or textiles obtainable according to any of claims 1 to 7, comprising a door trim support (5) and a visible surface of a pre-sewn cover (1) made of leather, artificial leather and/or textiles that also has at least one or several functional seams ($3a$, $3b$, $3c$) in addition to ornamental seams ($3d$), characterized in that the backsides of the functional seams ($3a$, $3b$, $3c$) are provided with perfect fit in at least one circumferential bead (6) in the region of transition from the visible surface to a standing edge towards a door panel (8), wherein the circumferential bead is formed into substantially an L-shape in vertical cross section, one end of the bead is engaged to a side of the visible surface of the trim support, and the other end is connected to a side of the standing edge of the trim support.

9. The trim panels according to claim 8, comprising door trims, roof pillars or trims in the region of the instrument panel of motor vehicles.

\* \* \* \* \*